United States Patent
Altman et al.

(10) Patent No.: US 7,228,306 B1
(45) Date of Patent: Jun. 5, 2007

(54) POPULATION OF DISCOVERY DATA

(75) Inventors: Valery Altman, Newton, MA (US);
Andrew Becher, North Attleboro, MA (US); Serge Marokhovsky, Upton, MA (US)

(73) Assignee: EMC Corporation, Hopkinton, MA (US)

( * ) Notice: Subject to any disclaimer, the term of this patent is extended or adjusted under 35 U.S.C. 154(b) by 533 days.

(21) Appl. No.: 10/335,601

(22) Filed: Dec. 31, 2002

(51) Int. Cl.
*G06F 7/00* (2006.01)
*G06F 17/00* (2006.01)
*G06F 12/00* (2006.01)
*G06F 17/30* (2006.01)
*G06F 15/173* (2006.01)

(52) U.S. Cl. .................. 707/100; 707/103 R; 707/203; 709/223; 709/224

(58) Field of Classification Search ............ 707/103 R; 709/224
See application file for complete search history.

(56) References Cited

U.S. PATENT DOCUMENTS 5,848,243 A * 12/1998 Kulkarni et al. ............ 709/224
6,122,639 A * 9/2000 Babu et al. ............. 707/103 R

OTHER PUBLICATIONS

U.S. Appl. No. 09/431,758, filed Nov. 1, 1999, Joseph G. Murphy, et al.
U.S. Appl. No. 09/431,758, filed Nov. 1, 1999, Joseph G. Murphy, et al.
"Design Pattern Elements of Reusable Object-Oriented Software" by Erich Gamma, Richard Helm, Ralph Johnson and John Vlissides ISBN-0-201-63361-2, © 1995 by Addison Wesley, pp. 139-150.

* cited by examiner

*Primary Examiner*—Don Wong
*Assistant Examiner*—Patrick A. Darno
(74) *Attorney, Agent, or Firm*—Muirhead & Saturnelli, LLC

(57) ABSTRACT

Described are techniques used in connection with management and processing of configuration data and performance data about a data storage system. The data is collected by one or more agents and forwarded to store components. The store components are responsible for maintaining persistent data objects in a repository. A server may process user requests issued from one or more consoles by retrieving data from the repository and displaying information based thereon on the consoles. The data collected by the agents may be in accordance with a first object model or data representation different from another object model or data representation of the repository. The store components update the repository using data collected by the agents.

35 Claims, 14 Drawing Sheets

POPULATION OF DISCOVERY DATA

BACKGROUND

1. Technical Field

This application generally relates to a computer system, and more particularly to techniques used in data management.

2. Description of Related Art

Computer systems may include different resources used by one or more host processors. Resources and host processors in a computer system may be interconnected by one or more communication connections. These resources may include, for example, data storage systems, such as the Symmetrix™ family of data storage systems manufactured by EMC Corporation. These data storage systems may be coupled to one or more host processors and provide storage services to each host processor. An example data storage system may include one or more data storage devices, such as those of the Symmetrix™ family, that are connected together and may be used to provide common data storage for one or more host processors in a computer system.

A host processor may perform a variety of data processing tasks and operations using the data storage system. For example, a host processor may perform basic system I/O operations in connection with data requests such as data read and write operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units. The logical disk units may or may nor correspond to the actual disk drives. Allowing multiple host systems to access the single storage device unit allows the host systems to share data stored therein.

It may be desirable to monitor data storage systems for a variety of different reasons, such as, for example, to obtain configuration data and/or performance data. Performance data may include, for example, data regarding system device usage and throughput, system load. System configuration information may be obtained, for example, at a predefined interval, or in connection with a system configuration modification, such as a logical or physical device reconfiguration. Monitoring and related operations for data storage system management may be automated. It may be desirable to have an automated monitoring system that efficiently provides updated configuration data and other information about a data storage system.

SUMMARY OF THE INVENTION

In accordance with one aspect of the invention is a method for merging a first representation of data with a second representation of said data producing a final representation of the data. A first representation of data in a first structure is provided. The first structure includes a first plurality of first entries. Each first entry is indexed by a key uniquely identifying each first entry in the first structure, each first entry being associated with a first entity. A second representation of the data in a second structure is provided. The second structure includes a second plurality of second entries, each second entry is associated with a second entity. A first entry corresponds to a second entry being indexed by a same key. Each first entity of a first entry is mapped to a second entity of a second entry corresponding to the first entry while removing the second entry from the second structure. The mapping utilizes an adapter structure through which the first and the second entities are associated. The final representation of data is produced as consisting of second entities associated with the first entries.

In accordance with another aspect of the invention is a computer system comprising: at least one agent that performs data gathering; at least one component about which said at least one agent is gathering data; a data repository that stores at least one of: configuration data and performance data; a plurality of store components for processing agent data; a server component that performs load balancing and distributes processing of received agent data to the plurality of store components in accordance with memory usage; and a data repository that stores said at least one of configuration data and performance data; and wherein each of said plurality of store components includes machine executable code that: retrieves currently stored data from said data repository corresponding to received agent data; and maps entities of said received agent data to corresponding entities of said data repository using an adapter structure; updates said data repository in accordance with said received agent data; and performs at least one operation using said adapter structure to perform said updates.

In accordance with another object of the invention is a computer program product for merging a first representation of data with a second representation of said data producing a final representation of said data. The computer program product comprises: machine executable code that provides a first representation of data in a first structure, said first structure including a first plurality of first entries, each first entry being indexed by a key uniquely identifying said each first entry in said first structure, each first entry being associated with a first entity; machine executable code that provides a second representation of said data in a second structure, said second structure including a second plurality of second entries, each second entry being associated with a second entity, a first entry corresponding to a second entry being indexed by a same key; machine executable code that maps each first entity of a first entry to a second entity of a second entry corresponding to said first entry while removing said second entry from said second structure and utilizes an adapter structure through which said first and said second entities are associated; and machine executable code that produces said final representation of data as consisting of second entities associated with said first entries.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
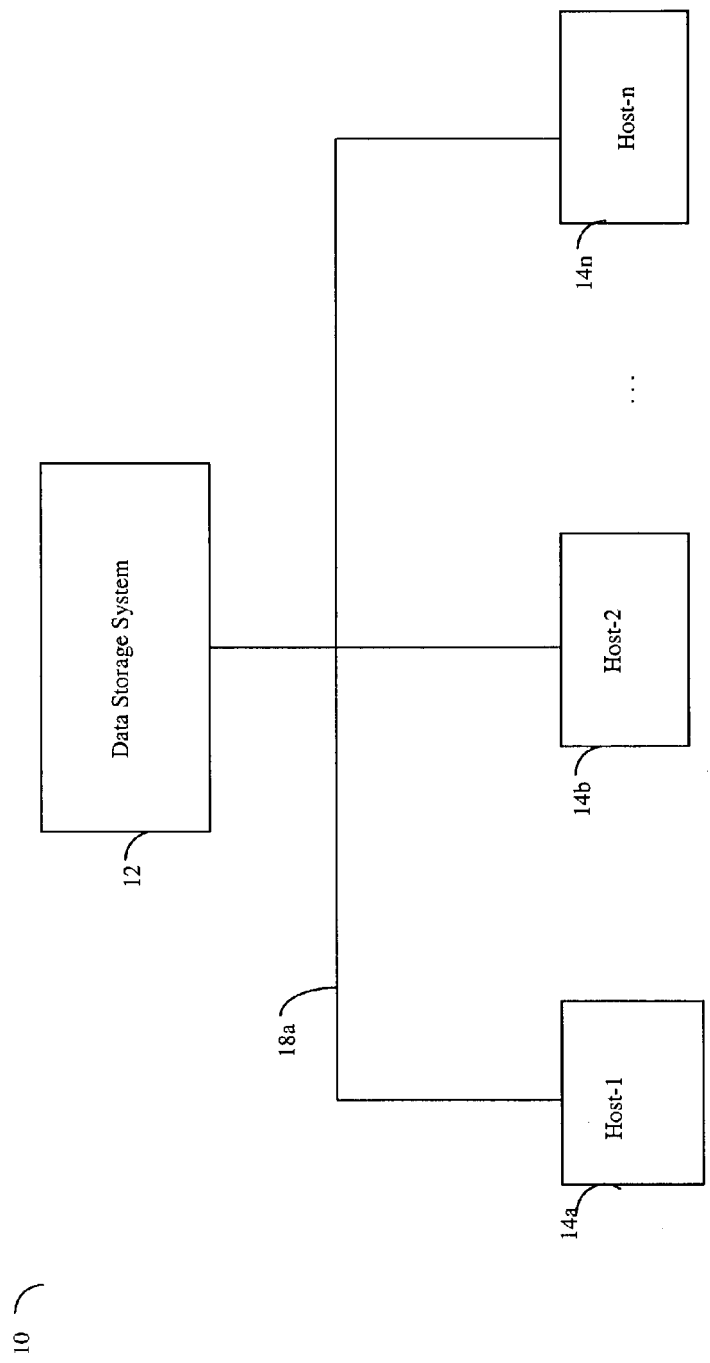
FIG. 1 is an example of an embodiment of a computer system according to the present invention.

Referring now to FIG. 1, shown is an example of an embodiment of a computer system according to the present invention. The computer system 10 includes a data storage system 12 connected to host systems 14a-14n through communication medium 18a. In this embodiment of the computer system 10, the N hosts 14a-14n may access the data storage system 12, for example, in performing input/output (I/O) operations or data requests. The hosts 14a-14n may also communicate with each other. The communication medium 18a may be any one of a variety of networks or other type of communication connections as known to those skilled in the art. The communication medium 18a may be a network connection, bus, and/or other type of data link, such as a hardwire or other connections known in the art. For example, the communication medium 18a may be the Internet, an intranet, network or other connection(s) by which the host systems 14a-14n may access and communicate with the data storage system 12, and may also communicate with other host systems included in the computer system 10.

Each of the host systems 14a-14n and the data storage system 12 included in the computer system 10 may be connected to the communication medium 18a by any one of a variety of connections as may be provided and supported in accordance with the type of communication medium 18a. The processors included in the host computer systems 14a-14n may be any one of a variety of commercially available single or multi-processor system, such as an Intel-based processor, IBM mainframe or other type of commercially available processor able to support incoming traffic in accordance with each particular embodiment and application.

It should be noted that the particulars of the hardware and software included in each of the host systems 14a-14n, as well as those components that may be included in the data storage system 12, are described herein in more detail, and may vary with each particular embodiment. Each of the host computers 14a-14n may all be located at the same physical site, or, alternatively, may also be located in different physical locations. Examples of the communication medium that may be used to provide the different types of connections between the host computer systems, the storage management system, and the data storage system of the computer system 10 may use a variety of different communication protocols such as SCSI, ESCON, Fibre Channel, or GIGE (Gigabit Ethernet), and the like. Some or all of the connections by which the hosts and data storage system 12 may be connected to the communication medium 18a may pass through other communication devices, such as a Connectrix or other switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform an administrative operation and may do so while performing data requests to the data storage system 12.

Figure 2:
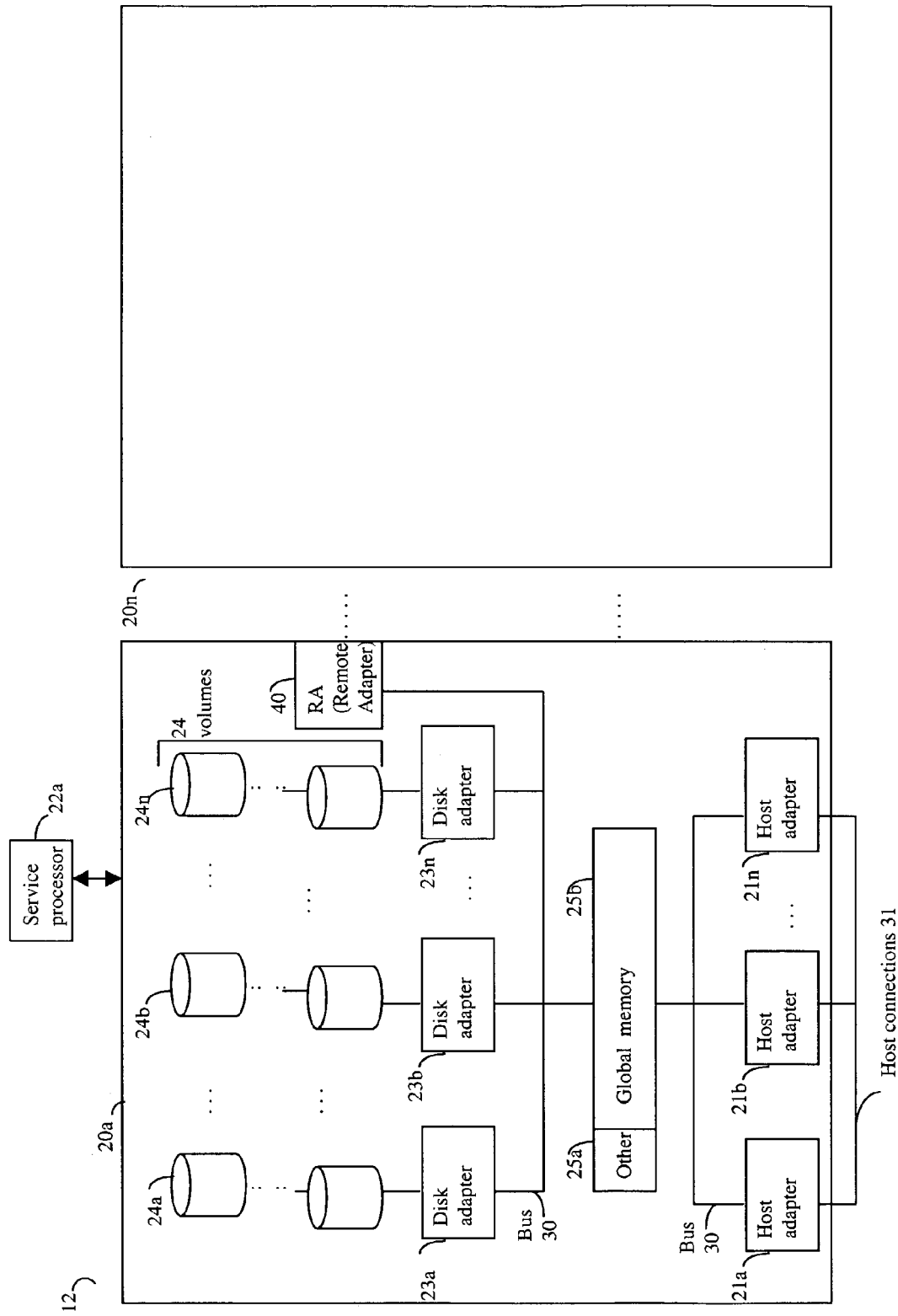
FIG. 2 is an example of an embodiment of a data storage system.

Referring now to FIG. 2, shown is an example of an embodiment of the data storage system 12 that may be included in the computer system 10 of FIG. 1. Included in the data storage system 12 of FIG. 2 are Symmetrix™ storage systems 20a-20n as manufactured by EMC Corporation of Hopkinton, Mass. In this particular example, each of the Symmetrix™ storage systems 20a-20n may be interconnected (not shown) as well as to the hosts through any one or more communication connections 30 that may vary with each particular embodiment and device in accordance with the different protocols used in a particular embodiment. Additionally, the type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include other types of data storage systems in combination with one or more Symmetrix™ systems. Each of 20a-20n may be resources included in an embodiment of the computer system 10 to provide storage services to, for example, host computer systems and/or the data manager system.

Each of the Symmetrix™ systems, such as 20a, may include a plurality of disk devices or volumes, such as the arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the Symmetrix™ system 20a, a single DA, such as 23a, may be responsible for the management of a row of disks or volumes, such as row 24a. Each of the DAs 23a-23n are connected, for example, by a bus 30 to a cache that includes a particular portion designated as global memory 25b. The DAs 23a-23n may perform data operations to and from the cache that may be included in the global memory 25b, for example, in communications with other disk processors or directors, and other components of the system 20a. Generally, the global memory 25b may be used in facilitating communications between components in the system 20a. The other portion 25a is that portion of memory that may be used in connection with other designations that may vary in accordance with each embodiment.

An embodiment of the Symmetrix™ system 20a may include a service processor 22a used to manage and monitor the system 20a. In one embodiment, the service processor 22a may be used in collecting performance data, for example, regarding the I/O performance in connection with system 20a. This performance data may relate to, for example, performance measurements in connection with a data request as may be made from the different host computer systems 14a-14n. This performance data may be gathered and stored, for example, in the global memory and/or other storage area.

The system 20a may also include one or more host adapters ("HAs") or directors 21a-21n. Each of these HAs may be used to manage communications and data operations between one or more host systems and the global memory.

The particular data storage system as described in this embodiment, such as a Symmetrix™ system by EMC Corporation or a disk, should not be construed as a limitation. Other types of commercially available data storage systems, as well as processors and hardware controlling access to these particular devices, may be also be included in an embodiment.

Also shown in the storage system 20a is an RA or remote adapter 40. The RA may be hardware including a processor used to facilitate communication between data storage systems, such as between two Symmetrix data storage systems. The RA may be used with the Remote Data Facility (RDF) product provided by EMC Corporation of Hopkinton, Mass.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. The HAs may be used in connection with communications between a Symmetrix data storage system and a host system. The RAs may be used in facilitating communications between two Symmetrix data storage systems. The DAs may be used in connection with facilitating communications to the associated disk drive(s) and LV(s) residing thereon.

The DA may cause I/O operations to be performed on a volume or device. In the following description, data may be accessed by LV in which a single DA manages data requests in connection with I/O operations of multiple LVs that may reside on a disk. The DA may accomplish this by creating job records for the different LVs associated with the particular DA. These different job records may be associated with the different LVs in a data structure stored and managed by each DA.

Figure 3:
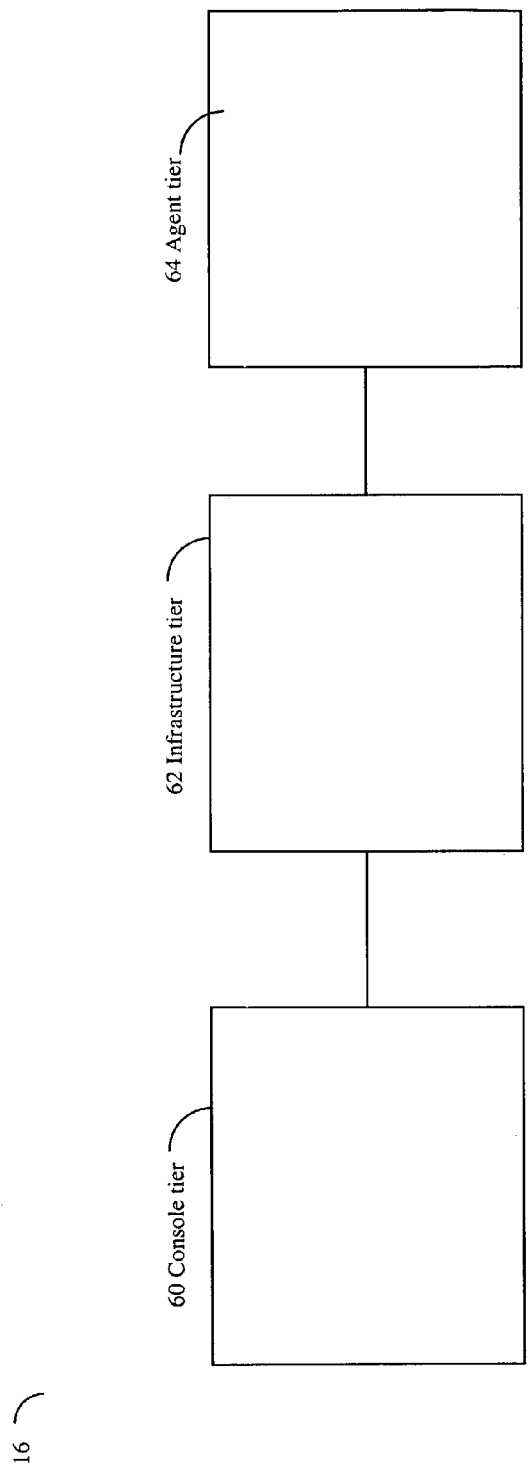
FIG. 3 is an example of an embodiment of a multi-tier architecture of a storage management system that executes within the computer system 10 of FIG. 1.

Referring now to FIG. 3, shown is an example of an embodiment of a multi-tier architecture of a storage management system 16 that may execute within the computer system 10 of FIG. 1. The storage management system 16 may perform a variety of different tasks and operations in connection with monitoring, management and reporting regarding the data storage system 12. In this embodiment, the storage management system has a multi-tier architecture. The storage management system 16 includes a console tier 60, an infrastructure tier 62 and an agent tier 64. Components of each of the foregoing tiers may reside and be executed in one or more of the host computer systems described in the computer system 10 of FIG. 1.

One embodiment of the storage management system is described, for example, in EMC-99-160, U.S. patent application Ser. No. 09/431,758, filed Nov. 1, 1999, entitled "MULTIPLE STORAGE ARRAY CONTROL", which is incorporated herein by reference.

Figure 4:
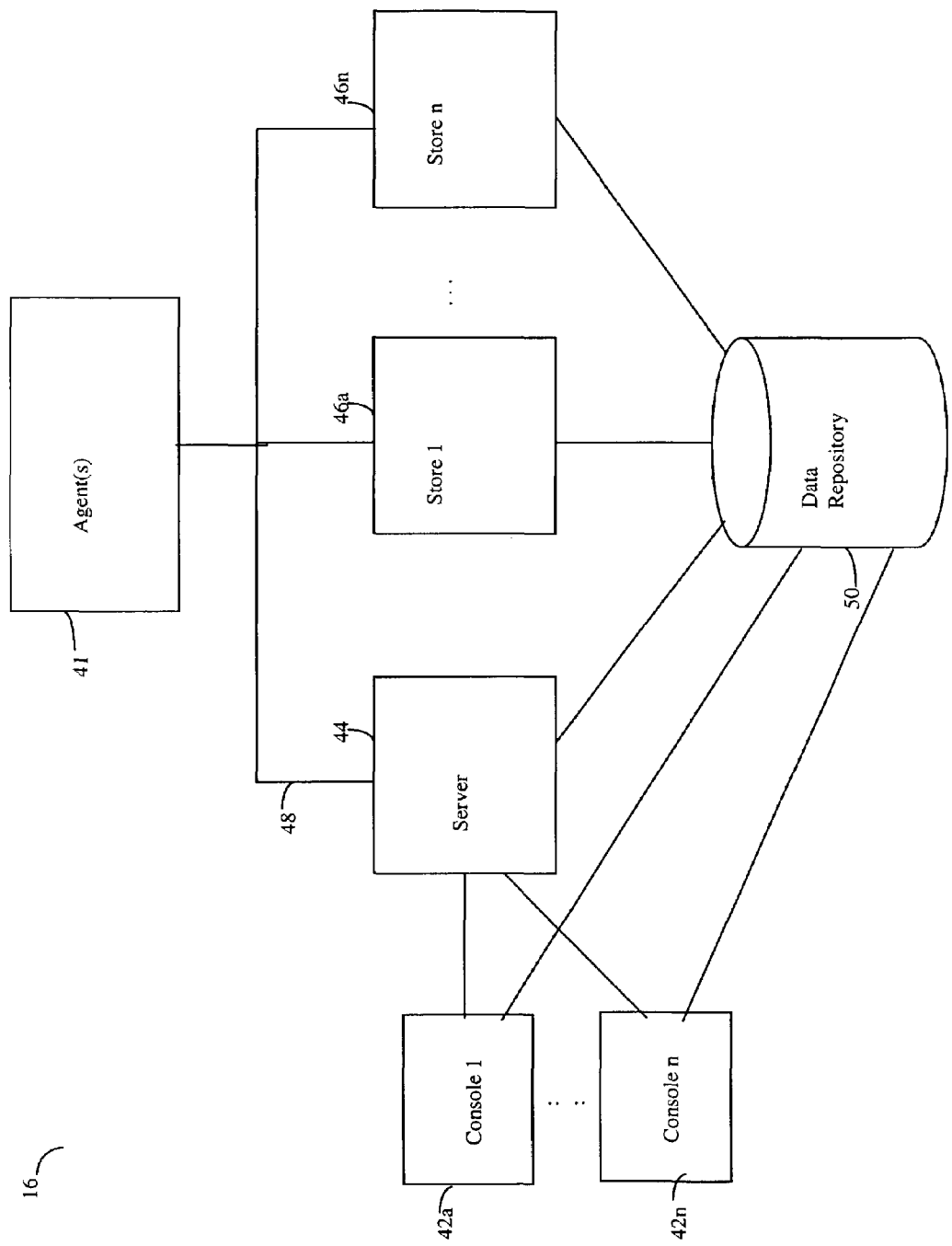
FIG. 4 is an example of components that may be included in an embodiment of the storage management system.

Referring now to FIG. 4, shown is an embodiment of components that may be included in the different tiers of the storage management system 16 of FIG. 3. Agent(s) 41, as well as additional applications, may reside and execute on one or more host systems. The agent(s) 41 may be included in the agent tier 64. As will be described in more detail in the following paragraphs, one embodiment of the agent(s) 41 may be characterized as a component that gathers data about the data storage system 12 in the computer system 10 of FIG. 1. For example, the agent(s) 41 may be used to obtain snapshots of different types of system configuration and monitoring data of the data storage system 12. The data gathered by agent(s) 41 may include, for example, performance data, and hardware failure information. The agent(s) 41 may obtain snapshots of configuration data at predetermined points in time as well as upon the occurrence of certain trigger events, such as, for example, the occurrence of a hardware failure, and a change in the physical or logical configuration of the data storage system.

Each of the agent(s) 41 may obtain configuration data about storage systems 20a through 20n, for example, described previously in connection with FIG. 2. Configuration data may be stored in a portion of global memory 25b included in each storage system. The configuration data as well as other monitoring data may be communicated to the agent 41 upon request by an agent. The configuration data may also be sent or "pushed" by a particular data storage system to the agent. Using data push and/or pull techniques, the agent 41 gathers a snapshot of data in this embodiment.

An embodiment may have the agent 41 gather data by sending a data request to the appropriate system entity, such as the appropriate data storage system. In one embodiment including the Symmetrix data storage system, an agent may gather data by sending a command to the data storage device using a predefined API (Application programming interface). Other APIs may be included in an embodiment in accordance with the different vendor hardware to interface with the different devices. Software may be executing on one or more of the processors included in the Symmetrix adapters, such as the host adapter, to process the data request of the agent. The software may obtain configuration data requested. An embodiment may store the configuration data, for example, in a portion of globally accessible memory within the Symmetrix data storage system and return the data to the requesting agent. An embodiment may also use other forms of machine executable instructions, such as those included in Read-only-memory, and/or hardware components to perform the data gathering.

It should be noted that the agent(s) 41 may be executing on a host system that is also running additional applications. It may be desirable that the agent run efficiently and not consume many computing resources of the host system when performing the data gathering described herein. Keeping this in mind, the agent(s) 41 may be developed to consume as few system resources as possible of the host system such that the other applications executing thereon are not adversely effected.

The agent(s) 41 may gather a single snapshot of data and forward the data to one of the stores components 46a-46n. An embodiment may include any one or more types of agents. In one embodiment, there are different types of agents executing on one or more hosts in which the agents have types that vary in accordance with the type of data that is collected. For example, there may be a storage agent for collecting data about a storage system, a switch agent for collecting data about a switch, a host agent for collecting data about a host computer, and the like. The particular types of agents may vary in accordance with each embodiment. The agent 41 included in FIG. 4 may be any one or more of these different types of agents that gather and forward data to the store 46a-46n.

An embodiment may also vary the number of devices associated with each agent type. For example, in one embodiment, there may be one host agent for each host system, and one or more system entities may be associated with other types of agents, such as a database agent may be associated with gathering data for one or more databases.

In one embodiment, the agent initially communicates with the server 44 who assigns a particular store 46a-46n to process the agent request. The server may assign the agent a store using any one or more of a variety of different techniques in accordance with each embodiment. For example, the server may execute a load balancing technique which assigns the store depending on the memory usage of each of the store systems. The one with the least amount of memory being utilized, for example, may be assigned to the requesting agent. Once the agent has been assigned as store, the agent communicates directly with the store for the remainder of the transaction rather than go through the server for forwarding the gathered data.

Also included in FIG. 4 are one or more consoles 42a through 42n, a server 44, and the one or more store components 46a through 46n. The server 44, the repository 50 and the one or more store components 46a-46n may be included within the infrastructure tier 62. The one or more consoles 42a-42n may be included in the console tier 60. The server 44, as well as the stores 46a through 46n, may communicate with the data repository 50. The server 44 may be used in connection with performing tasks, such as displaying data at a user's request on one or more of the consoles 42a through 42n, for example, in the form of a graphically user interface (GUI). When a user makes a request, for example, using a GUI displayed using the console 42a, the server system 44 may query a database included in the data repository 50 to obtain requested data. Subsequently, the query results may be displayed on a display screen or other output device associated with the console 42a. Each of the stores 46a through 46n may be a process used to store the data sent by one or more agents that may be executing on any one or more of host computer systems 14a through 14n.

The console may include a display device upon which a user interface may be displayed to view and manage the storage environment of the data storage system 12. In one embodiment, the console may be a Java-based application launched from a browser, such as the Microsoft Internet Explorer or Netscape, or launched from a command line. The console may use a collection of services and resources of the server. The server may be an interface between the consoles and the stores and data repository, and provide a variety of services in connection with communication, security, data retrieval from the repository, user interface, distributed processing installation, and other functionality as may be included in an embodiment. In one embodiment, for example, the server may provide, for example, for installing and starting the consoles, login authentication, alert and event management, real-time statistics, object management to maintain a list of objects in the repository, agent management to maintain a list of available agents, and the like. The server may retrieve data from the repository for display by the console(s). A user may initiate a request from one of the consoles for a particular graphical display, for example, of the current storage system 12 configuration and other statistics related thereto.

In one embodiment, the data repository 50 may include a relational database implemented as an Oracle database which stores the configuration data and other performance related data. Data may be retrieved and stored using, for example, SQL queries and TopLink by Oracle Corporation. As described in more detail elsewhere herein, the data repository 50 may hold data about managed objects, for example, such as storage systems, ports and devices, host systems, file systems, databases, and connectivity devices. The repository may include, for example, data about configurations, statistical data, alerts, device status information, links, metadata, data dictionary, and the like. The data included in the data repository may allow applications to perform sophisticated management and tracking of changes within the storage environment of the data storage system 12.

It should be noted that although the foregoing paragraphs describe configuration data being stored in a database, the techniques described herein are not limited to databases or configuration data. Rather, the techniques described herein may be applied to any type of data. Additionally, the data may be stored in any type of data container, such as, for example, one or more files included in a flat or other type of file system, or other type of data storage available in an embodiment.

One or more of the agents included in the host systems 14a through 14n may send snapshots of configuration data and other information to one or more of the stores 46a through 46n at predetermined intervals or upon the occurrence of certain trigger events. The data repository 50 may include other configuration data corresponding to an earlier snapshot. The stores may subsequently retrieve this earlier snapshot of data that has been previously committed to the data repository 50. In one embodiment, the data repository 50 may include a database maintaining a current snapshot of the most recent configuration, and other data regarding devices and other components included in the data storage system 12. When a store 46a-46n receives data from an agent, the store component may subsequently retrieve corresponding data from the data repository 50, and update the configuration data from the data repository in accordance with the most recent snapshot obtained from an agent. The store may subsequently then commit the revised snapshot of configuration data to the database included in the data repository. The store components may serve as an interface between the agents and the Repository, and additionally populate the repository with persistent data from the agents.

An embodiment of the computer system 10 may perform load balancing among the different store components, and in accordance with other hardware and/or software components included in the computer system 10 of FIG. 1. The computer system 10 may also perform other management functions as may be included in each particular embodiment.

It should be noted that the techniques described herein may be used in connection with different hardware and/or software configurations. In one embodiment, for example, techniques described in the following paragraphs may be implemented with an object model using the Java programming language. As described elsewhere herein, the data repository 50 may include a relational database implemented using an Oracle database. The hosts may be executing any one or more of a different variety of operating systems and file systems. Similarly, the data storage system 12 may include one or more different file systems. The data storage system 12 may also include a heterogeneous mix of software and hardware components, for example, by different vendors. Each of the particular hardware and/or software combinations may vary in accordance with each embodiment.

In one embodiment, the agent may obtain a snapshot of the data at various points in time. The task of managing the configuration data to keep a most recent copy of the configuration data available may be allocated to the store components and the computer system 10 may be configured so as not to materially adversely effect any other applications executing on the host system.

It should be noted that an embodiment of the system 10 of FIG. 1 may include and combine the functionality of the server, the store components, the console(s), and the data repository of the storage management system 16, as well as the agents and other applications described herein, in various combinations on one or more host computer systems. The foregoing description should not be construed as a limitation of any particular allocation of functionality in accordance with a particular hardware configuration.

Figure 5:
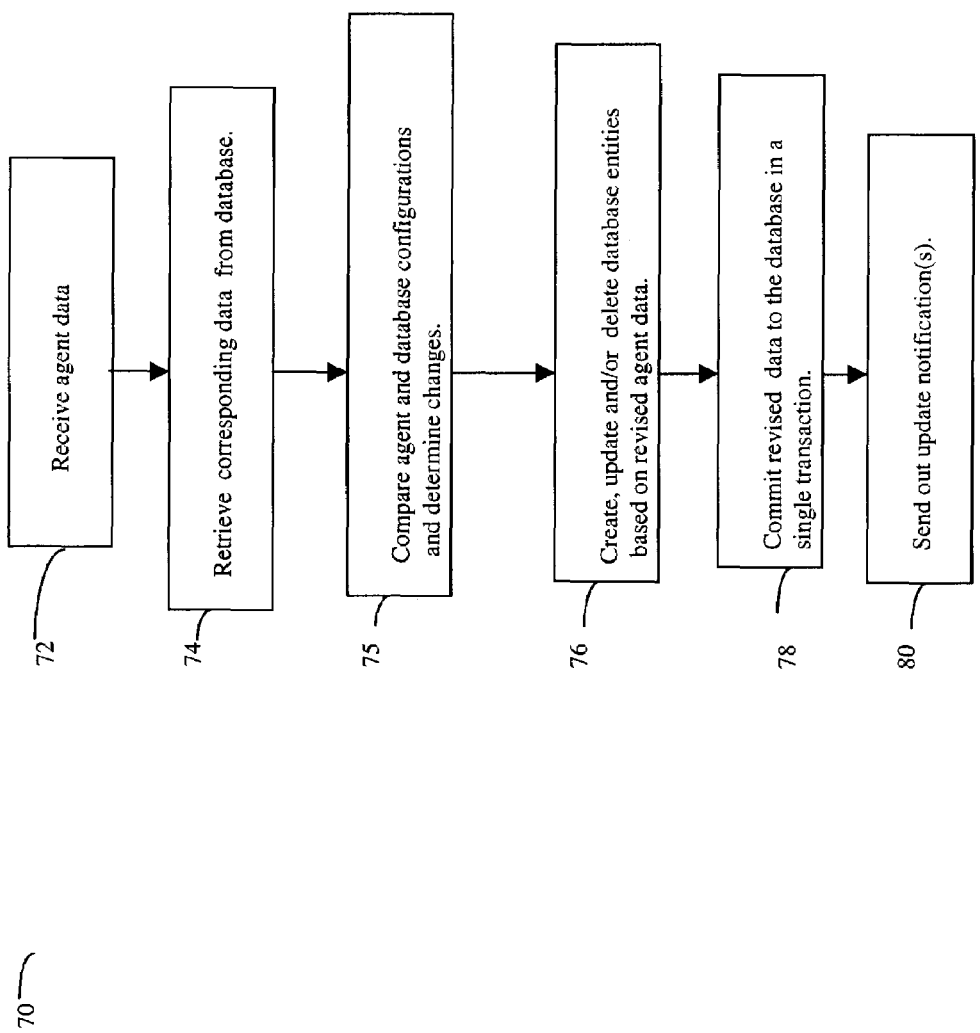
FIG. 5 is a flowchart of method steps that may be performed by components of the storage management system within the computer system 10 of FIG. 1.

Referring now to FIG. 5, shown is a flowchart of method steps of one embodiment for processing a snapshot of configuration data in the computer system 10 of FIG. 1. It should be noted that the steps of flowchart 70 may be executed within the storage management system 16 by one or more of the store components 46a through 46n when data is received from an agent. At step 72, the agent data is received by a store component. The agent data may be stored in memory utilized by the store component. At step 74, corresponding data is retrieved from the database. This corresponding information may also be stored within memory of the store component that received the revised or updated configuration data from an agent. At step 75, the received agent data and the retrieved database data are compared to determine the changes to be made to the database copy. At step 76, the store component creates, updates, and/or deletes the database information included in the data repository 50 based on the most recently received agent data. At step 78, the updated data is committed to the database in a single transaction. At step 80, any required notifications to other components and/or persons are performed. These notifications may include, for example, notification messages to users, such as system managers, via e-mail, messages and revised data for console or other display devices, and the like in accordance with the newly received agent data.

It should be noted that the store component may perform processing steps in connection with converting the received agent data into a format that may be stored in the database. This may include mapping objects of received agent data into the objects of formats included in the data repository 50.

Figure 6:
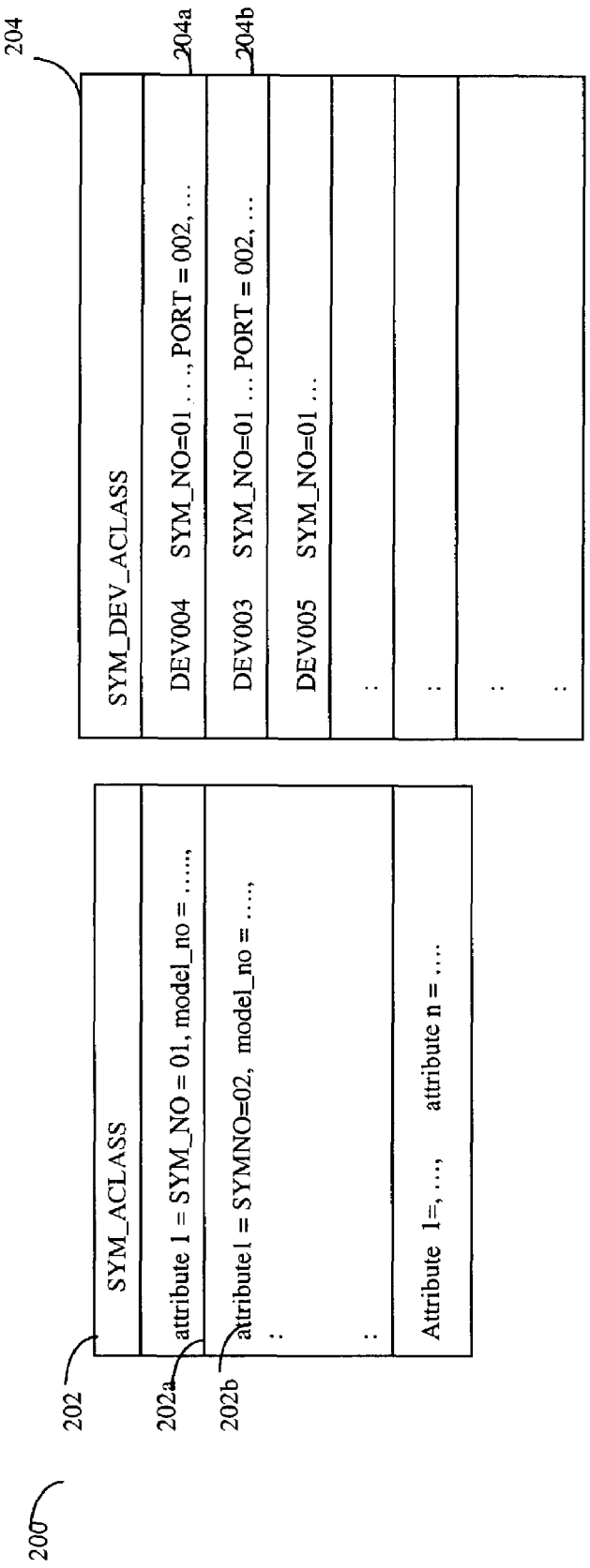
FIG. 6 is representation of an embodiment of a data object model as utilized by an agent.

Referring now to FIG. 6, shown is an example of one embodiment of data objects corresponding to a configuration data entity in accordance with an agent's object model. In other words, an agent included in the host system such as 14a may store data objects of the form represented in FIG. 6 by the representation 200. The representation 200 may correspond to data gathered by a storage agent, for example, about one or more Symmetrix data storage systems. The representation 200 includes a first data object 202 describing the data storage systems for which data is being gathered. The second data object 204 describes devices and other entities structurally within the data storage systems described in 202.

Data may be sent in a form corresponding to the representation 200 to a store component included in the storage management system 16. In this example, Symmetrix data storage systems 20a and 20b may be represented, respectively, by rows 202a and 202b in the object 202. The object 204 may represent all the devices and other entities included within the Symmetrix data storage systems 20a and 20b as represented in 202. Each row of the object 202 may correspond to one instance of an object that will be created in the database model. Similarly, each column of the element 202 corresponds to particular attributes of the objects to be created in the database model. For example, referring to row 202a, a first attribute may represent the number or identifier, SYM_NO, of this particular data storage system as 01.

The second object 204 representing information about each of the devices and other components related to the object 202 may have an object name SYM_DEV_ACLASS. Included in the object 204 may be one or more rows of information. Each row corresponds to a particular device within a Symmetrix data storage system 20a or 20b. Each row of the object 204 corresponds to an instance of an object that will be created in the database model. Each column of the object 204 corresponds to an attribute of an object in the database model. For example, the row 204a includes attribute values describing a device DEV004 belonging to storage system SYM_NO having a value of 01 with a PORT 002.

It should be noted that the foregoing records 202 and 204 may describe data from the view point of an agent in an object model that may be characterized as relatively simple. The simplicity of the object model in this instance may be related to the lack of complexity of data operations that the agent performs. In contrast, the data included in the data repository 50 of the storage management system may have a different more complex object model associated with the same configuration data as represented by 200.

Figure 7:
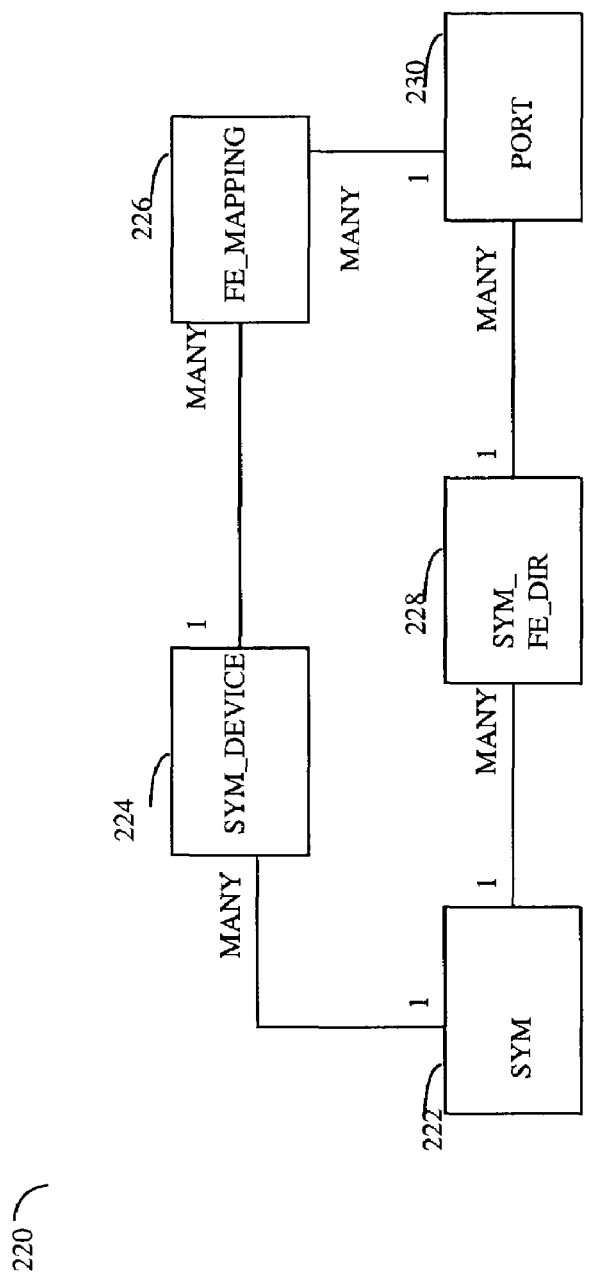
FIG. 7 is an example of a representation of a data object model as utilized by the data repository.

Referring now to FIG. 7, shown is an object model 220 that may represent information about a data storage system such as 20a. The object model 220 may be a data representation as utilized within the database included in the data repository 50. In the representation 220, a storage system 20a, such as a Symmetrix data storage system, may correspond to a SYM object 222. The object model 220 describes what objects may be related to what other objects. The SYM object 222 may have a one-to-many relationship respectively with a device corresponding to the SYM_DEVICE object 224. The SYM_DEVICE object or class 224 may have a one-to-many relationship with the FE_MAPPING object or class 226. The FE_MAPPING class in this example may be characterized as implementing a many-to-many relationship between devices represented by this SYM_DEVICE class 224 and the PORT class 230. The SYM_FE_DIR class 228 may be characterized as representing a front end adapter or processor of the corresponding Symmetrix data storage system.

The representations 220 and 200 may be used to describe the same set of configuration data about a data storage system 20a that is a Symmetrix data storage system by EMC Corporation from two different data point of views. The representation 200 in this instance describes a first data viewpoint of the agent, and the representation 220 in this instance describes a second data viewpoint of the data repository. Other entities, such as a file system and other components may be represented using other object models. Similarly, other classes of objects may have different corresponding representations when viewed by the models of the agent and the data repository.

One of the tasks that a store component 46a included in storage management system 16 may perform is converting data from the input or received model 200 as viewed by agent to a view point of model 220 as utilized in the data repository 50. Techniques for performing this data mapping are described in more detail in following paragraphs.

In this particular embodiment, an agent may communicate with the store component. The object model as utilized by the agent in this particular embodiment may be characterized as relatively flat and simple partially due to the fact that the agent is allocated the task of data gathering, rather than more complex data operations. A more complex object model may be needed, for example, when processing different types of user requests for monitoring operations and other types of management tasks as performed by the store and server components.

As will be described in following paragraphs, entities included in an object model, such as those corresponding to storage system, file systems, and components included therein, may be uniquely identified by one or more attributes. The attribute(s) of a particular object model that uniquely identify an entity may be referred to as alternate keys encapsulated within in an alternate key class. Data that may be gathered by an agent in the form of agent class data objects may be referred to as transactions. A transaction is a set of data that is sent from the agent to the store component to be processed and stored in the database atomically as a single transaction.

An agent may define different types of transactions in accordance with a snapshot of data obtained. For example, an agent may send a full configuration data set to a store component. An agent may also send a partial configuration data set, for example, describing only a portion of devices included in the data storage system. Other embodiments may have different types of transactions. The store component accordingly may process and update the data repository in accordance with data received from the agent. As described with reference to the object models 200 and 220 in FIGS. 6 and 7, a particular Symmetrix data storage system may be uniquely identified by the attribute SYM_NO. A particular device may be identified by a combination of alternate keys which represents the data storage system such as SYM_NO as well as a particular identifier or name of the device such as DEV004. The alternate key(s) are used in following paragraphs to uniquely identify entities and obtain and retrieve necessary information from data structures. In other words, the alternate keys may be used in identifying a particular object and establishing its relationship with other objects.

One problem with the different view points or models of the same physical data set in an object oriented system as described herein is how to design the methods for accessing and managing the data. In the embodiment herein, one option is to modify the database class object and the methods for accessing the data therein. However, this may require modification of the object model and may create undesirable changes, such as increasing the complexity of the data object model. Another approach is to use another class to serve as an interface or mapping between an agent class object and a corresponding database class object. This latter approach may be used in order to simplify the database object model and not create any dependencies between the database object model and other objects to perform this particular operation.

What will now be described are techniques using the latter approach in which a separate mapping class is created to facilitate interaction between the agent data object model and the database data object model of the storage management system. As described in following paragraphs, this mapping class may be referred to as an adapter class having an adapter object associated therewith.

Figure 8:
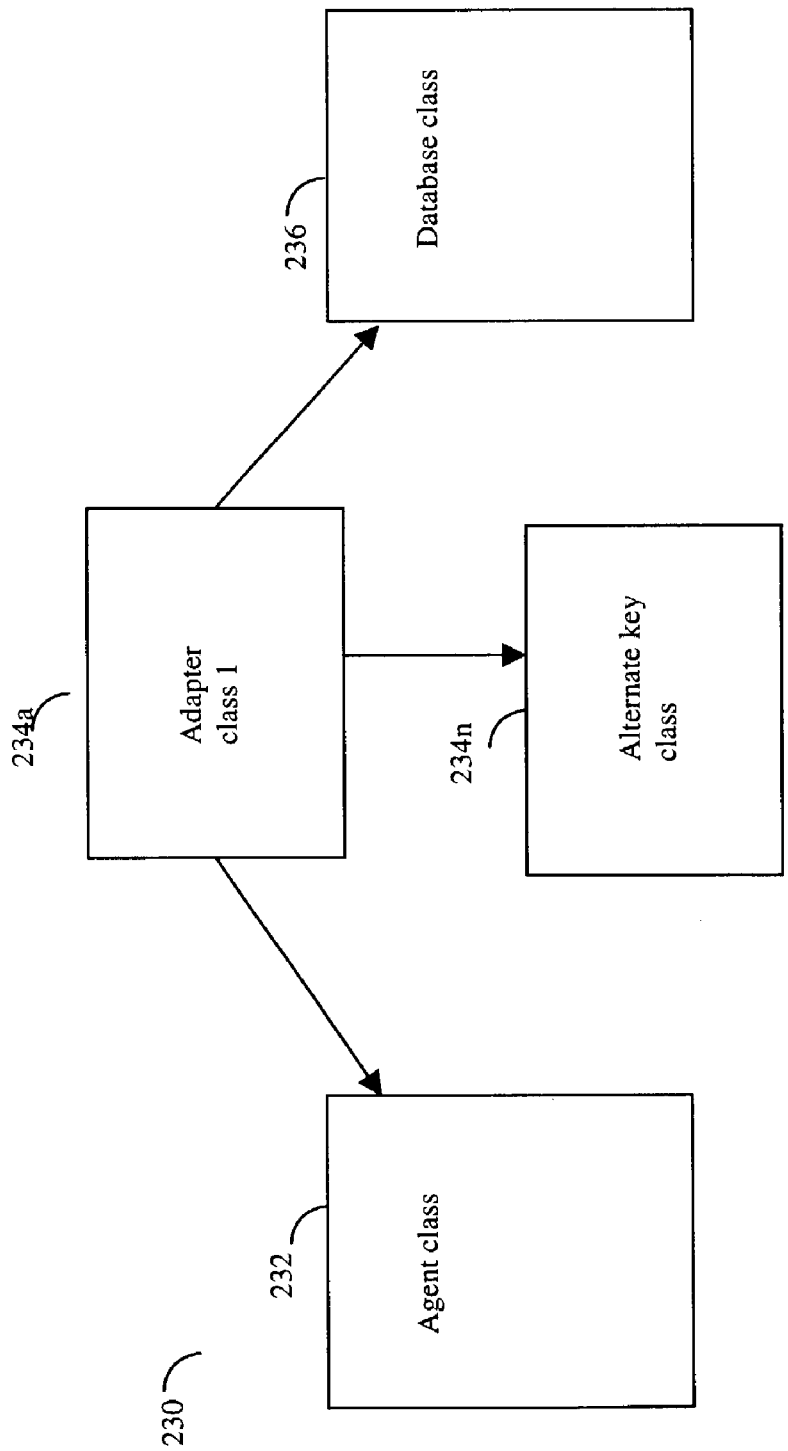
FIG. 8 is a representation of one embodiment of an adapter class.

Referring now to FIG. 8, shown is an example of a representation 230 of an adapter class and its relationships with other classes. In the representation 230, an object adapter 234a relates an agent class 232 to a database class 236. As discussed elsewhere herein, each row of an agent class object may result in the creation of one or more adapter classes. The representation 230 shows the relationships between a single instance of an adapter class and instances of other classes. In one embodiment, each object instance of an adapter class 234a may be associated with zero (0) or one (1) agent class instance, zero (0) or one (1) database class instance and one (1) alternate key class instance. An alternate key class encapsulates one or more fields uniquely identifying a particular database object. Each of the foregoing are described in more detail elsewhere herein.

It should be noted that an adapter class may be not be associated with any database class, for example, when an adapter class is created to map relationships between two or more database objects. It should also be noted that an adapter class may not be associated with any agent class, for example, when an agent sends incomplete information to a store about one or more devices within a Symmetrix data storage system. The agent may not send complete information but may send, for example, the Symmetrix identifier or number (e.g., SYM_NO=001) and the device name (e.g., DEV_NAME=003) forming an alternate key for a Sym_device database object. Based on this information, the store creates a Sym_device adapter object that does not have an associated agent class object.

Objects of the agent class 232 are instantiated on the store based on the received agent data. The adapter class is used to map an agent class of a first object model, as utilized by the agent, to a database class of a second object model, as utilized by the data repository. An embodiment may have other relationships and associations than as described in connection with FIG. 8.

The adapters and associated classes described herein may be used to encapsulate the coding logic, for example, of identifying persistent objects of the database class 236, creating any new database objects, as well as performing queries associated with specific types and copying data from the agent class into the database class in processing steps described elsewhere herein. Alternate keys as described herein may be used to encapsulate fields uniquely identifying a database object.

As described herein, an adapter may also create one or more additional adapters. In other words, when a first adapter is created, adapters of all types necessary for the creation of a database object associated with the first adapter may also be created.

In the representation 230, the agent class object 232 may correspond to the object 202. The database class object 236 may correspond to the object 222. The adapter 234 may be used to relate corresponding objects in each of the different viewpoints or models, respectively, of the agent and the database included in the storage management system 16.

Figure 9:
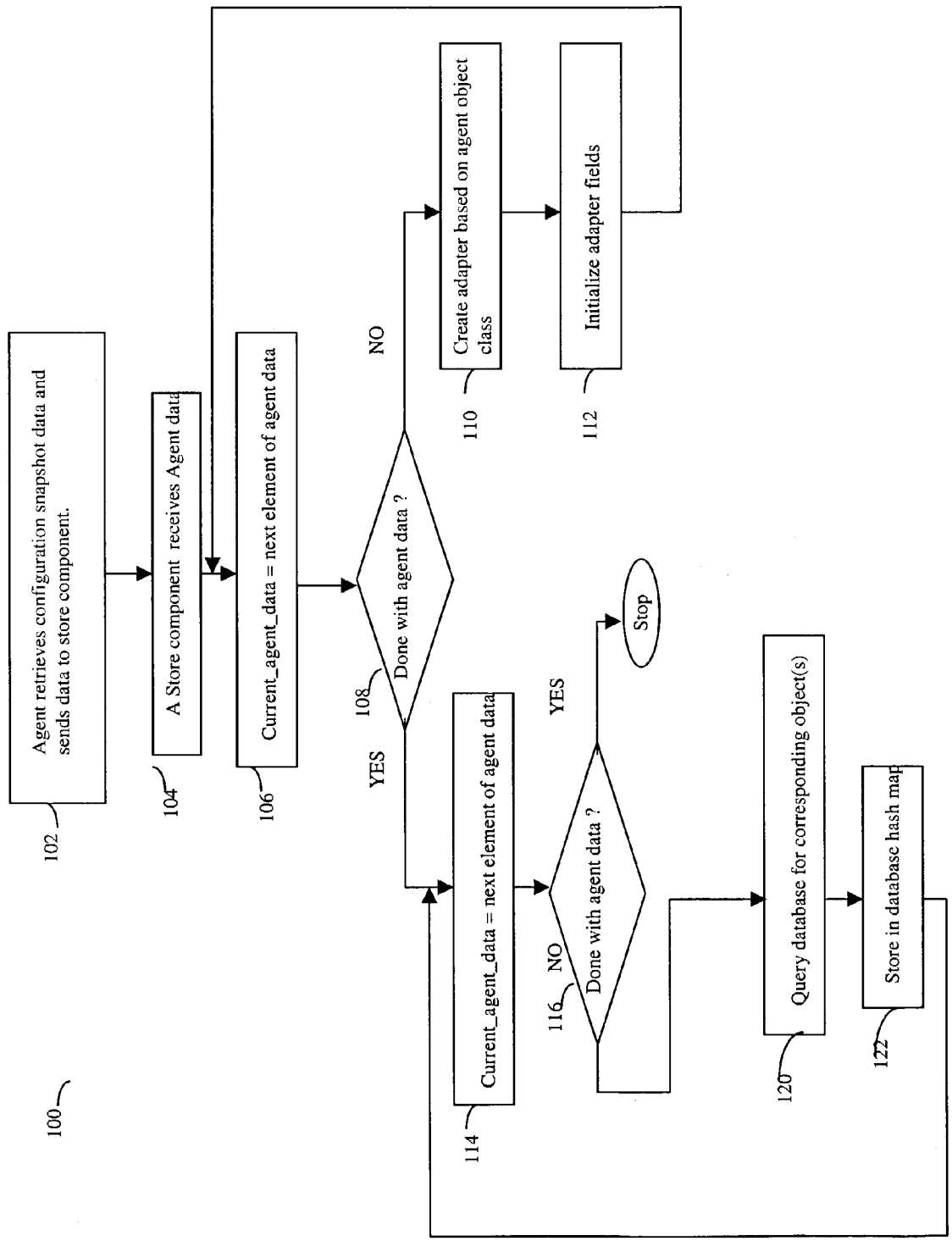
FIG. 9 is a flowchart of more detailed processing steps of a retrieving corresponding data from the database as previously described in connection with FIG. 5.

Referring now to FIG. 9, shown is a flowchart 100 of more detailed processing of steps 72 and 74 described previously in connection with FIG. 5. At step 102, the agent on the host retrieves configuration snapshot data and sends this to the storage management system. At step 104, a particular store component receives the agent data. At step 106, a variable current agent data is assigned the next element in the agent data. In this embodiment, at least one adapter is created for each row of data in the agent objects 202 and 204. A determination is made at step 108 as to whether processing of the agent data is complete. If not, control proceeds to step 110 where an adapter is created based on the agent object class. At step 112, the adapter fields are initialized and control proceeds to step 106 to process the next element of agent data until all of the agent data has been processed. At step 108, once a determination is made that processing of agent data is complete, control proceeds to step 114.

The loop formed by processing steps 106, 108, 110 and 112 represent more detailed processing steps of reading and storing the agent data received by the store component. In one embodiment, the agent objects may be stored in memory in a hash map with associated data structures. The hash maps described herein may be implemented as hash table data structures using techniques known to those skilled in the art to perform management and creation of the hash maps. This is described in more detail in following paragraphs. Upon completion of processing all agent data, adapters have been created for each of the particular agent class objects and control proceeds to step 114. Referring back to the representation 230, the adapters 234 have been created and are associated with the agent class object. However, the associated pointers relating the adapter to a particular database class object 236 have not yet been established.

Referring back to the representation 200, for example, for the class SYM_ACLASS represented by the object 202, an adapter object may be created at step 110 for each row of data in the agent object 202. Each row in the data object 204 may result in the creation of one or more adapters. For example, if the object 204 is processed prior to object 202, for example, the first record 204a results in the creation of 3 adapter objects. A first adapter object of a first class is created for the device corresponding to the entity represented by the row 204a. A second adapter object of a second class is created for the associated Symmetrix "01" and a third adapter object of a third class is created for the associated port "002".

Referring back to flowchart 100 of FIG. 9, when a determination is made at step 108 that all of the agent data has been initially read in and processed with adapters created, control proceeds to step 114 where a traversal is again made through the agent hash map data. As described in following paragraphs, the agent data and associated adapters are stored in an agent hash map. The processing performed by the loop of steps 114, 116, 120 and 122 walk through the agent hash map to populate a database hash map with all of those objects included in the database corresponding to the last snapshot of configuration data stored therein. A representation of a database hash map is described in more detail in following paragraphs.

At step 114, the first element of the agent hash map is examined. Control proceeds to step 116 where a determination is made as to whether agent data processing is complete. If so, processing stops. Otherwise, control proceeds to step 120 where a database of the data repository 50 is queried for any corresponding data objects associated with the current entry of the agent hash map. The database object(s) retrieved based on the query are stored in a database hash map at step 122. In one embodiment, step 120 determines which top-level object corresponds to the adapter of the current agent hash map entry being examined on a particular iteration. A query is made of the database to find all instances hierarchically related to the top-level object.

It should be noted that for a given agent hash map entry, the "retrieval of all instances hierarchically related to a top-level object" may include all objects hierarchically at or beneath the level of a top-level object in accordance with the model of the database or data repository. For example, an entry in the agent hash map may correspond to a top level object such as one corresponding to a Symmetrix storage system or a file system and may be characterized as a first or highest level object in a hierarchical relationship of the database model described herein.

In this particular instance, fields or attributes included in an agent object may be used to uniquely identify a top level object in the database object corresponding to the alternate key(s) described elsewhere herein. For example, a particular data storage system has an associated identifier, such as SYM_NO for the Symmetrix data storage system, which may be used to uniquely identify a corresponding database object. The data included in the repository 50 has a relationship which may be characterized as a hierarchical relationship. Accordingly, when the current entry in the agent hash map being examined is a top level object (such as corresponding to a Symmetrix), all data base objects hierarchically underneath or related to this object (such as devices, ports and the like within this Symmetrix) are retrieved from the database to populate the database hash map.

As a result of executing the processing steps of flowchart 100, two sets of data are stored in memory as utilized by a store component. A first set of data is stored in the agent has map that is indexed by alternate keys. Each row in the agent hash map corresponds to an agent adapter and associated agent data object. The alternate keys of the row are used as an index into the database hash map to identify a corresponding database object. At this point in processing, the database hash map is populated with database objects corresponding the configuration data existing in the database objects. As described in following paragraphs, the alternate keys of the agent hash map are used to index into the database hash map to determine if there exists a corresponding database object.

Figure 10:
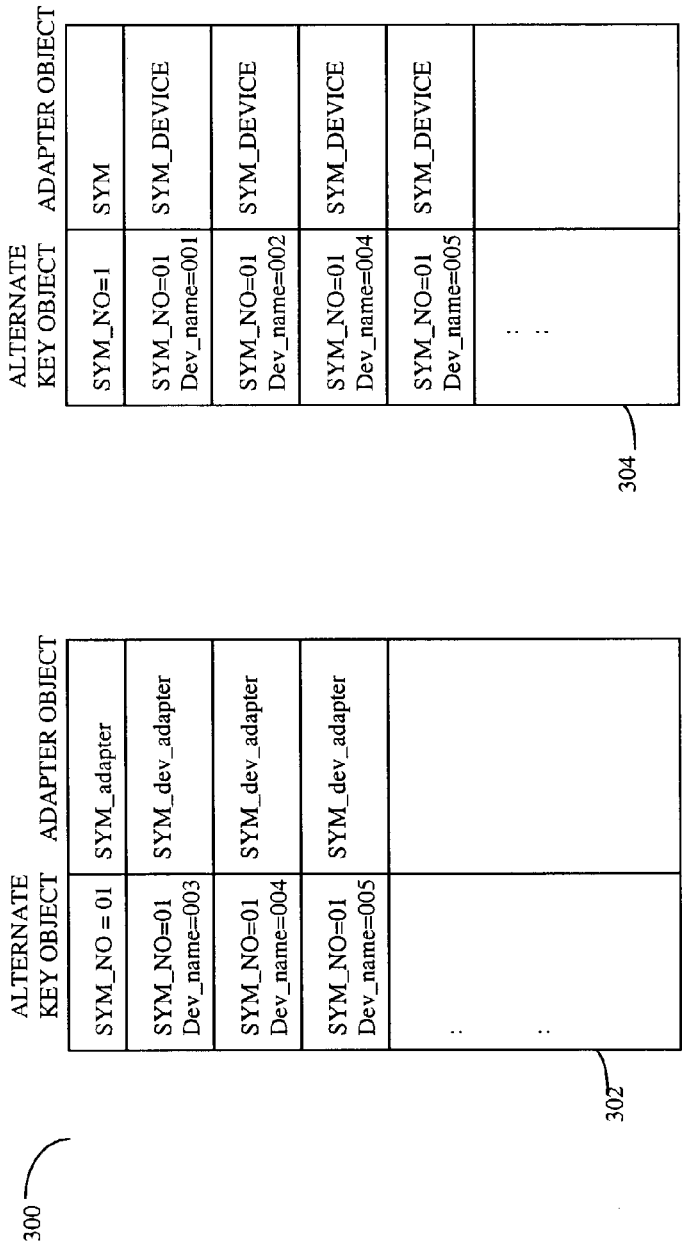
FIG. 10 is a representation of data included in an agent hash map and a database hash map.

Referring now to FIG. 10, shown is a representation of the hash maps 300 that include the agent adapter data and the database objects. The representation 300 includes an agent hash map 302 and a database hash map 304. The agent hash map 302 may be organized such that the alternate key or keys of the ALTERNATE KEY OBJECT corresponding to a particular object in the database model are used for retrieval of information from the agent hash map 302 as well as for retrieval of corresponding entries in the database hash map 304. In this example, the agent hash map 302 includes a first row that corresponds to a data storage system having an identifier of 01. Rows 2 through 4 of the agent hash map 302 each correspond to devices included in that same data storage system identified by the field SYM_NO having a value of 01. Using the alternate key values included in the first column of 302 of the ALTERNATE KEY OBJECT, particular database objects may be uniquely identified. The database hash map 304 may be indexed by the same set of key or alternate keys in the first column as included therein. The second column includes a reference to the particular database object.

It should be noted that each element in the column entitled ADAPTER OBJECT of the agent hash map 302 corresponds to an instance of a particular adapter class, and each element in the column entitled ALTERNATE KEY OBJECT corresponds to an instance of a particular alternate key class. Similarly, each element in the column of the database hash map 304 labeled DATABASE OBJECT corresponds to an instance of particular database class as included for example in the object model 220 of FIG. 7.

The foregoing hash maps are representations of collections of data associated with each of the adapters and database objects. Particular embodiments utilize any one of a variety of different data structures, for example, in associating a particular entry in the agent hash map with its associated adapter data structure.

Once the hash maps of the representation 300 have been stored in memory and include the agent adapter and associated data and the database objects, these two hash maps may be further processed to produce a resulting data set. The resulting data set is a merging of the two models resulting in a set of configuration data that is updated in accordance with the received agent data that is in the format of the database objects.

Figure 11A:
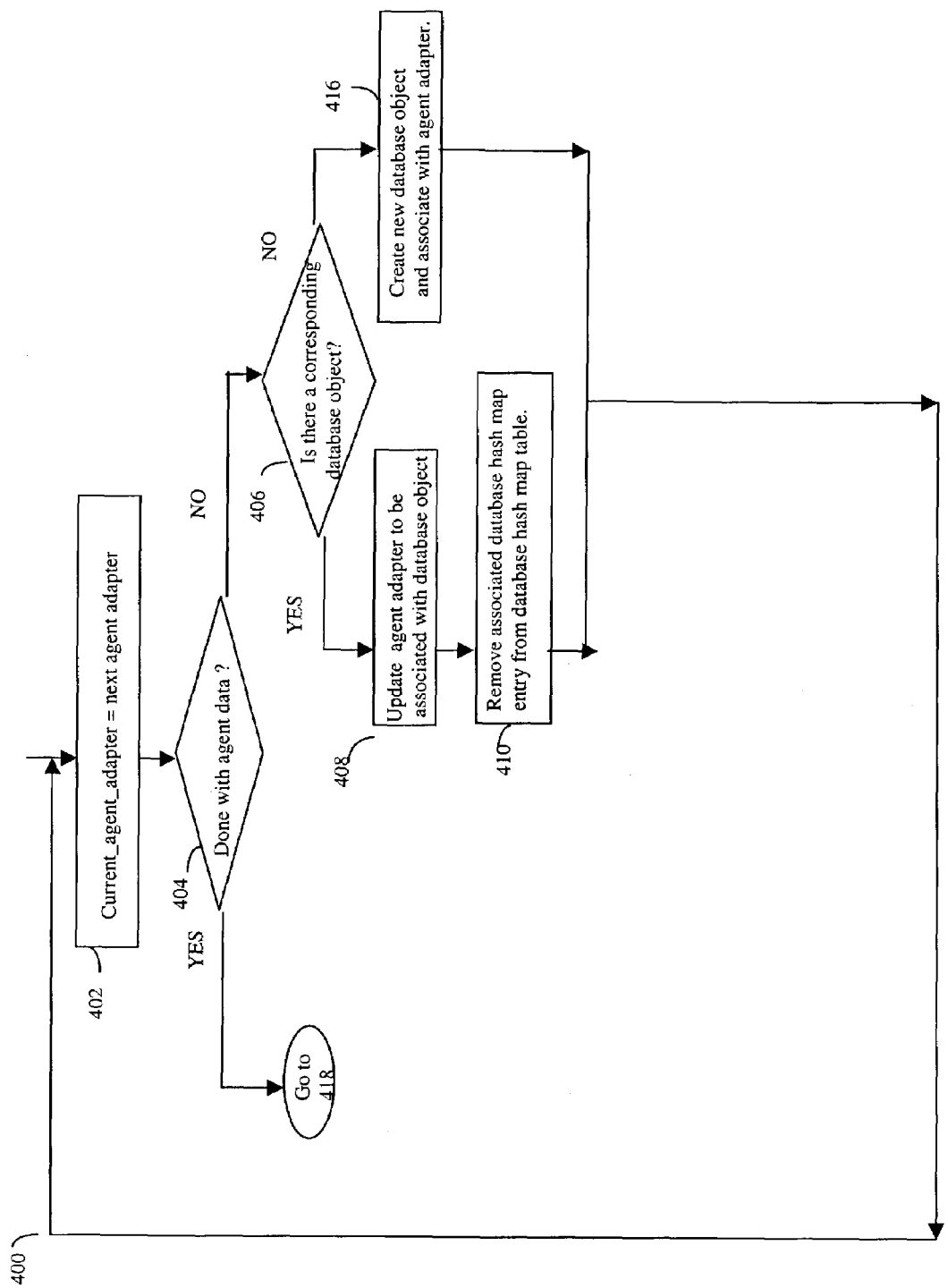
FIGS. 11A and 11B are flowcharts of more detailed processing steps of determining changes in the configuration data and creating new database objects as needed as previously described in connection with FIG. 5.
Figure 11B:
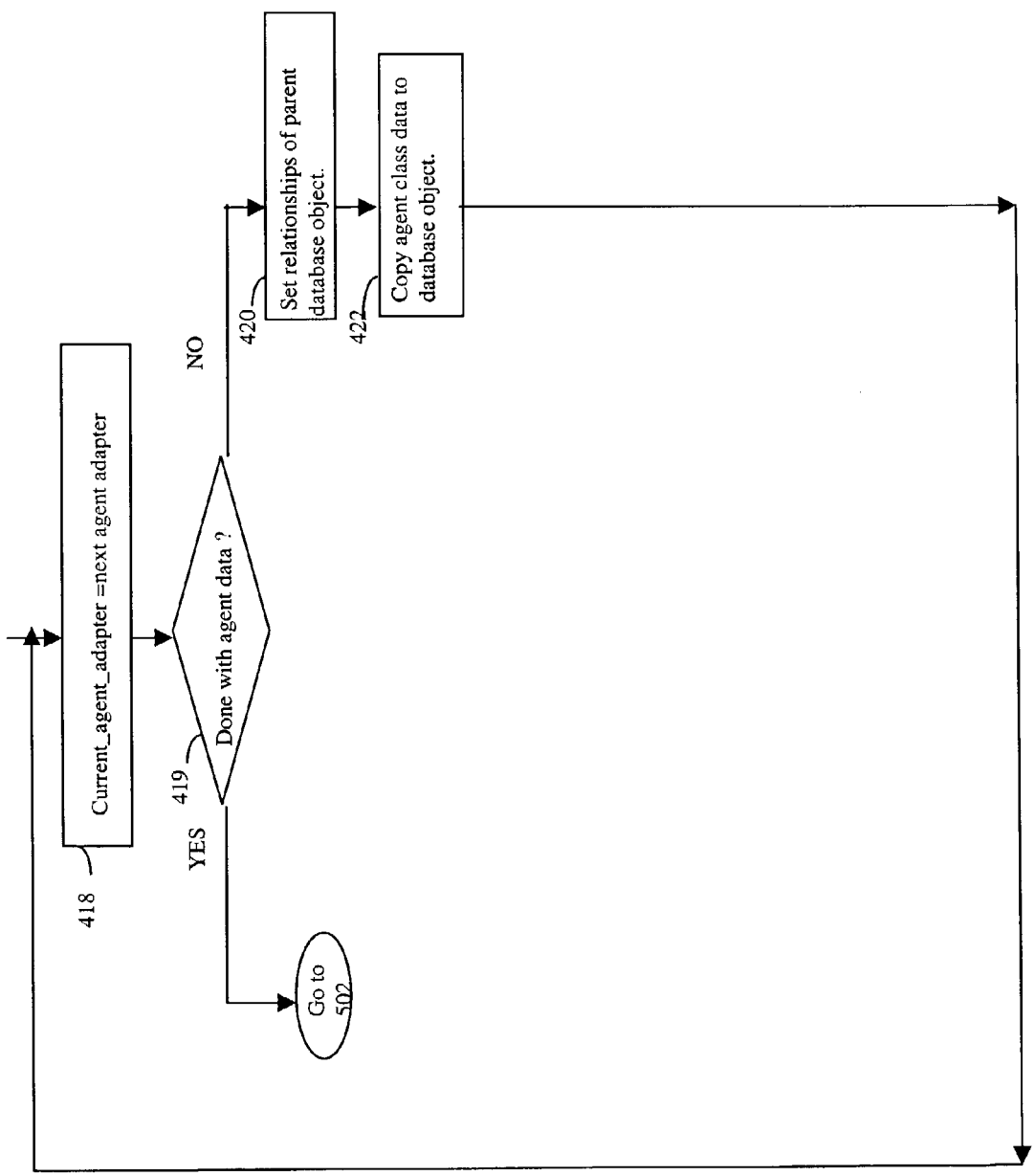

Referring now to FIGS. 11A and 11B, show are flowcharts of method steps for processing the data included in the representation 300 of FIG. 10. These flowcharts show more detail processing associated with steps 74, 75 and 76 of FIG. 5. The flowchart 400 examines each entry in the agent hash map 302. In step 402, the first entry in the agent hash map is examined. At step 404, a determination is made as to whether processing of agent data is complete. If processing of agent data is not complete, control proceeds to step 406 where a determination is made as to whether there is a corresponding database object included in the database hash map 304. If, at step 406, it is determined that there is a corresponding database object for the current agent element being examined from the agent hash map 302, control proceeds to step 408 where the agent adapter of the current agent hash map entry is updated to be associated with the database object. At step 410, an entry is deleted from the database hash map indicating that this entry has been processed. In this example, the effect of executing step 414 results in disassociating a pointer or breaking a link between an entry in the database hash map 304 and the associated database objects. Other embodiments may have other representations of the data structures and accordingly have other processing steps in implementing the steps of flowchart 400.

As a result of completing step 408, for example referring back to FIG. 8, an instance of an adapter 234 may be associated with the particular instance of a database class 236. In this embodiment, this may be performed by associating an adapter included in the agent hash map 302 with a particular object of included in the database hash map 304.

At step 406, if it is determined that there is no corresponding database object for the current agent data being examined, control proceeds to step 416 where a new database object is created and associated with the agent adapter of the current agent hash map entry. Control proceeds to step 402 where the next agent adapter entry from the agent hash map 302 is examined until processing of all agent hash map entries are complete as determined by step 404.

If step 404 determines that processing of agent hash map entries is complete, control proceeds to step 418 where another traversal is made through the agent hash map entries by assigning the current agent adapter to the next agent adapter, which in this iteration is the adapter of the first agent hash map entry. At step 419, a determination is made as to whether processing of all agent data is complete. If processing is not complete, control proceeds to step 420 where relationships may be established with any parents of the database object. In this particular embodiment, all children of a parent may additionally have a reference to the parent such that a pointer exists from the parent object to the child object as well as from the children to the parent.

Control proceeds to step 422 where agent class data that has been updated is copied to the database object. Referring back to FIG. 8 with representation 230, the agent class object 232 may have one or more data fields copied to the actual database class object 236. It is the database class object 236 that is committed to the database at a later processing step. Control proceeds to step 418 where the adapter of the next entry of the agent hash map table is examined.

After the processing steps of flowchart 400 of FIGS. 11A and 11B have been completed, database objects have been created in the database hash map 304 for those elements included in the agent hash map. The database objects included in the database hash map 304 having a corresponding agent object and entry in the agent hash map have also been updated and deleted from the hash map 304. When deleting an element from the database hash map 304, the database object itself persists, however, the associated entry has been deleted, for example, by disassociated the database hash entry with the database object. Accordingly, at this point in processing, database hash map 304 includes those entries which do not have a corresponding agent object. In other words, each of the elements included in hash map 304 that remain after executing steps of flowchart 400 are those database objects corresponding to configuration data not included in the received agent data. Logical and/or physical components corresponding to entries in hash map 304 at this time may have been, for example, deleted from the data storage system as a result of system reconfiguration. The data objects remaining in the hash map 304 may be marked for deletion from the database of the repository or other persistent data container, for example, using functionality including in the Toplink API.

Figure 12:
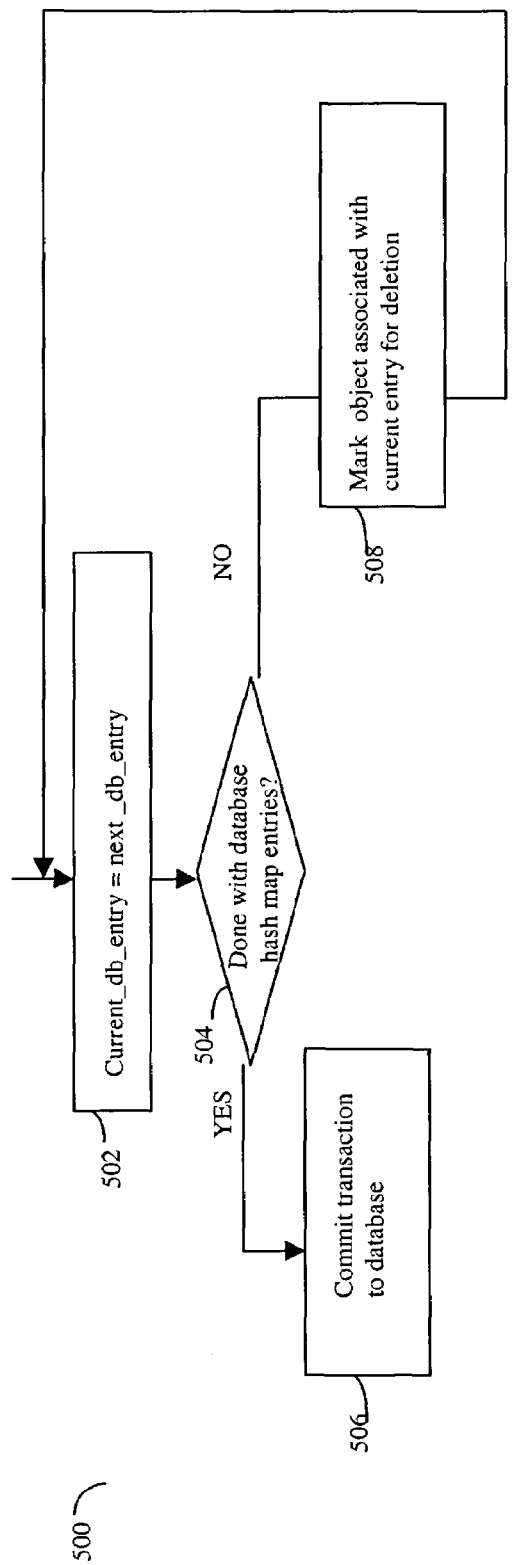
FIG. 12 is a flowchart of more detailed processing steps associated with removing remaining entries from the database hash map, deleting the associated database objects, and committing the updated transaction to the database as described previously in connection with FIG. 5.

Upon determining at step 419 that all agent data has been processed, control proceeds to step 502 of the flowchart 500 of FIG. 12.

Referring now to FIG. 12, shown is a flowchart 500 of processing steps for marking objects of configuration data for deletion from the database in accordance with received agent data. As described above, this may be performed by traversing the database hash map 304. At step 502, the data object associated with the first entry of the database hash map 304 is examined. At step 504, a determination is made as to whether all the database entries included in the database hash map 304 have been processed. If not, control proceeds to step 508 where the objects associated with a particular entry in the hash map 304 is marked for deletion. Control proceeds to step 502 where the next entry is examined. Processing proceeds until all of the entries in the database hash map 304 have been examined and the associated database objects marked for deletion. At step 506, the transaction as represented by the existing database objects is now committed to the database resulting in deletion of the previously marked database objects.

The foregoing processing steps traverse each entry in the agent hash map 302 and create new entries for database objects that do not already exist in the database. Additionally, while traversing the agent hash map 302, existing database objects are updated and new database objects are created in accordance with the agent hash map 302. As database objects having corresponding agent hash map entries are updated, any corresponding entry in the database hash map 304 is removed. Upon completion of traversing the agent hash map 302, any elements or entries remaining in the database hash map 304 may be deleted since these are no longer referenced or used in the configuration data received from the agent. Accordingly, such devices, for example, may have been taken off line or have been reconfigured such that they have been eliminated as previously described in the database objects of hash map 304.

In one embodiment, the objects and methods for accessing them by the store and/or server components may be written using the Java programming language. Functionality included in a particular Java implementation defines a java hash map class as described, for example, the Java Developer Kit V1.2 or greater by Sun MicroSystems, Inc. The java hash map class provides functionality for storing a given object in accordance with one or more keys. Similarly, other methods are provided for manipulating and managing data included in the hash maps in this particular embodiment. Other embodiments may use other techniques and functionality as may vary in accordance with each embodiment.

One embodiment of the foregoing adapter class includes four methods for performing the operations described herein. For the adapter class, there may be a first method for performing the query to retrieve information from the database using the alternate keys. For example, this method may be used to retrieve particular single entry from the database or all configuration data associated with a top level data object, such as a data storage system, identified by a particular identifier, such as the identifier SYM_NO previously described herein. A second method may be provided to look up an entry in the database hash map 304 based on a particular key value. This same second method may also set a reference pointer within an adapter to establish a relationship between a particular adapter and a database object. The second method may also remove any entries from the database hash map as the associations between database objects and adapters are created. A third method may establish any needed parent-child relationships between objects. A fourth method may copy data from an agent record to a database object.

It should also be noted that other embodiments may combine different functionalities described herein in different procedures, functions and methods than as described herein. For example, the previously-described method 3 and 4 functionality may be combined into a single method in an embodiment.

The foregoing techniques may be used to merge two different graphs. Each of the graphs may correspond, for example, to different models or representations of a particular set of data. In this particular example, the data may correspond to configuration data and/or performance data. There may be a one-to-one, a one-to-many, or a many-to-many relationship between the particular entities of a model as described herein. However, other types of data and relationships there between that may be graphically represented may also be combined or merged using the techniques described herein. The foregoing techniques provide an efficient technique for removing and deleting items and merging two graphical representations of data.

Figure 13:
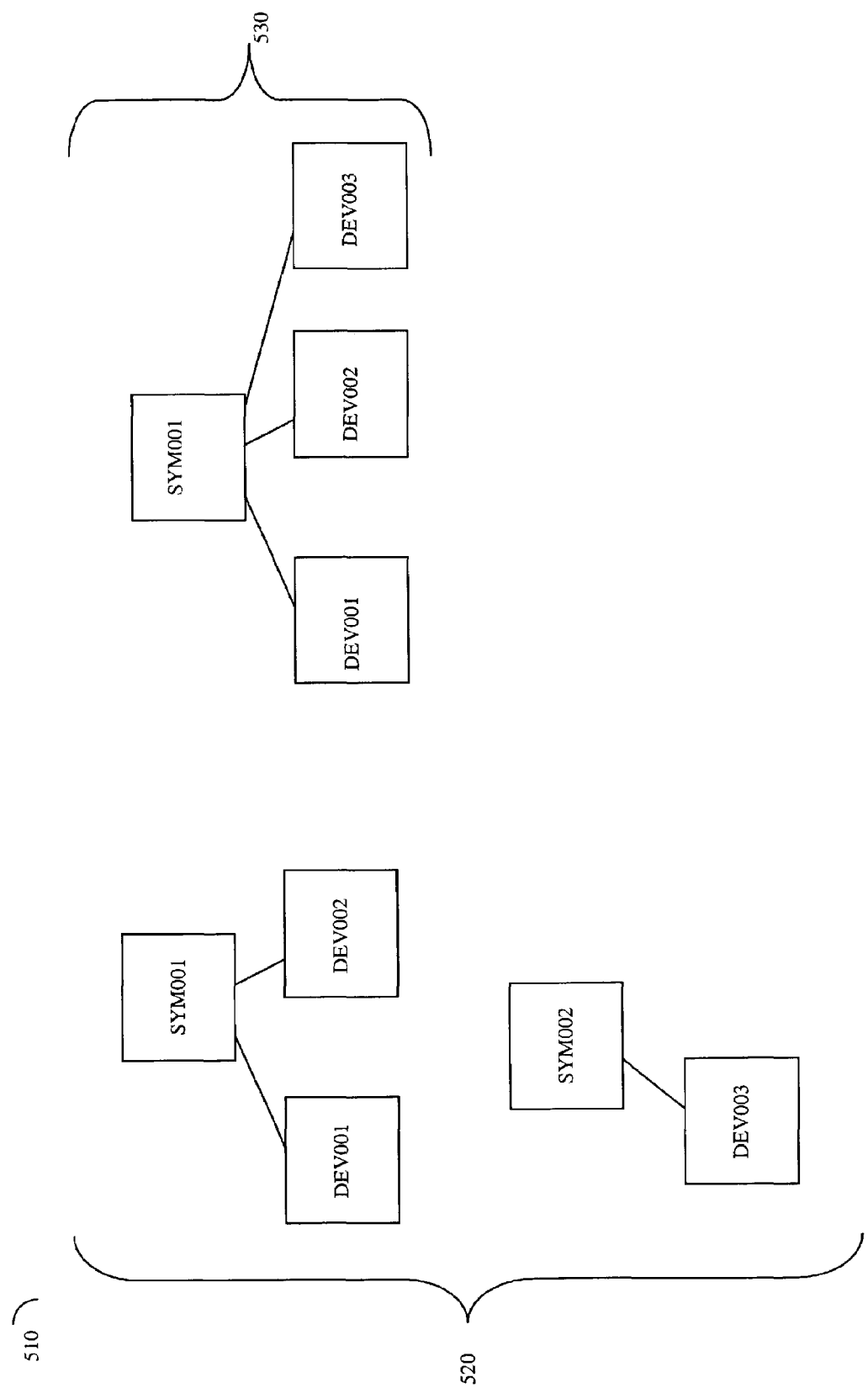
FIG. 13 is an example of a representation of configuration data snapshots at two different points in time.

Referring now to FIG. 13, shown is an example of a graphical representation of data elements 510. In FIG. 13, the representation 510 includes a first set of graphical elements 520 and a second set of graphical elements 530. The graphical elements 520 may correspond, for example, to an updated representation of configuration data as communicated from an agent to a store component. The representation 530 may correspond to the graphical representation of information included in the data repository to be updated in accordance with the representation 520. The foregoing techniques may be used to update the data included in the data repository from the representation 530 in accordance with the revised representation 520.

The foregoing description utilizes adapters to minimize impact on existing code and object models as well as provide for encapsulation of data. The foregoing is an efficient technique that provides for merging and updating configuration data and other information where the same data may be represented in different object models or different data viewpoints.

The techniques for data gathering are described herein in connection with agents that perform data gathering operations executed independently of other agents herein. The agents are may execute on one or more host systems and interact with a server and store components in which the server distributes the processing of agent data between one or more store components. The foregoing provides for comparison and updating of complex data structures using a generic algorithm executed in the distributed system including the server and store components. Each of the store components independently performs the generic algorithm to operate independent of other store components to process agent data. By utilizing the adapter described herein, the steps of performing the generic algorithm as executed by each store system are insulated from the complexity of the data structures being compared, and the code for manipulating data therein, allowing for code reuse that does not vary with the different complex data structures. The adapter class provides for this insulating layer to connect corresponding complex data structures of different object models.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for merging a first representation of data including configuration data of a data storage system at a first point in time with a second representation of said data including configuration data of the data storage system prior to the first point in time and producing a final representation of said data for storage in a data container representing an updated state of the data storage system, the method comprising:

providing a first representation of data in a first structure stored in a memory, said first structure including a first plurality of first entries, each first entry being indexed by a key uniquely identifying said each first entry in said first structure, each first entry being associated with a first entity representing data collected about the data storage system at said first point in time, said first representation using a first data model different than a second data model used by said data container, said first data model using one or more first entities for said first representation;

providing a second representation of said data in a second structure stored in a memory, said second structure including a second plurality of second entries, each second entry being associated with a second entity representing data collected about the data storage system prior to said first point in time, a first entry corresponding to a second entry being indexed by a same key, said second representation using said second data model of said data container, said second data model using one or more second entities for said second representation;

determining, for each first entry of said first structure, whether said each first entry has a corresponding second entry in said second structure;

for each first entry of said first structure, if said each first entry is determined by said determining step to have a corresponding second entry in said second structure, updating an adapter structure associated with said first entry to map a first entity of said first entry to a second entity of said second entry and then removing said second entry from said second structure;

producing said final representation of data using said second data model, said final representation including second entities associated with said first entries and representing an updated state of the data storage system; and storing said final representation of data to said data container using said second entities.

2. The method of claim 1, further comprising:
for each second entry remaining in said second structure, removing said second entity associated with said each second entry from said final representation.

3. The method of claim 1, further comprising:
for each first entry, if there is a corresponding second entry in said second structure, updating said second entity associated with said second structure in accordance with said first entity.

4. The method of claim 3, further comprising:
for each first entry, if there is no corresponding second entry in said second structure, creating a second entity and associating said second entity with said first entity.

5. The method of claim 4, further comprising:
performing operations using corresponding first and second entities associated by an adapter structure using methods included in an adapter class of which said adapter structure is an instance.

6. The method of claim 5, wherein said adapter structure includes a first reference to said first entity from said adapter structure, and a second reference to said second entity from said adapter structure.

7. The method of claim 5, further comprising:
retrieving existing second entities in accordance with a top-level element of said first structure and associating a second entry with each of said second entities retrieved, said top-level element corresponding to a predetermined top level of a hierarchical relationship between said top-level element and other elements in said second representation of said data.

8. The method of claim 7, wherein said second entities are stored in a data repository.

9. The method of claim 8, wherein said second entities are stored in a persistent storage container as data objects, each of said second entities corresponding to an instance of a data object in said second representation.

10. The method of claim 9, wherein said second entities represent elements of configuration data of a data storage system.

11. The method of claim 7, further comprising:
traversing said first entries of said first structure and performing said determining, said updating and said creating while performing said traversing.

12. The method of claim 11, wherein said retrieving is performed prior to said traversing.

13. The method of claim 12, further comprising:
traversing said first entries of said first structure and creating an adapter structure for each of said first entries.

14. The method of claim 13, wherein said traversing said first entries and said creating an adapter structure is performed prior to said retrieving.

15. The method of claim 1, wherein said method is performed in a computer system.

16. The method of claim 1, wherein said first representation corresponding to a first graphical representation of elements having a first hierarchical relationship, said second representation corresponds to a second graphical representation of elements having a second hierarchical relationship different from said first hierarchical relationship.

17. The method of claim 16, wherein said first graphical representation is a hierarchical relationship of data objects of a first model and said second graphical representation is a hierarchical relationship of data object of a second model different from said first model.

18. The method of claim 17, wherein said first model includes first data objects that are different from second data objects included in said second model, and said first data objects are mapped to corresponding ones of said second data objects.

19. A computer readable medium storing machine executable code for merging a first representation of data including configuration data of a data storage system at a first point in time with a second representation of said data including configuration data of the data storage system prior to the first point in time and producing a final representation of said data for storage in a data container representing an updated state of the data storage system, the computer readable medium comprising:

machine executable code that provides a first representation of data in a first structure stored in a memory, said first structure including a first plurality of first entries, each first entry being indexed by a key uniquely identifying said each first entry in said first structure, each first entry being associated with a first entity representing data collected about the data storage system at said first point in time, said first representation using a first data model different than a second data model used by said data container, said first data model using one or more first entities for said first representation;

machine executable code that provides a second representation of said data in a second structure stored in a memory, said second structure including a second plurality of second entries, each second entry being associated with a second entity representing data collected about the data storage system prior to said first point in time, a first entry corresponding to a second entry being indexed by a same key, said second representation using said second data model of said data container, said second data model using one or more second entities for said second representation;

machine executable code for determining, for each first entry of said first structure, whether said each first entry has a corresponding second entry in said second structure;

machine executable code that, for each first entry of said first structure, if said each first entry is determined using said machine executable code for determining, to have a corresponding second entry in said second structure, updates an adapter structure associated with said first entry to map a first entity of said first entry to a second entity of said second entry and then removes said second entry from said second structure;

machine executable code that produces said final representation of data using said second data model, said final representation including second entities associated with said first entries and representing an updated state of the data storage system; and machine executable code that stores said final representation of data to said data container using said second entities.

20. The computer readable medium of claim 19, further comprising:

for each second entry remaining in said second structure, machine executable code that removes said second entity associated with said each second entry from said final representation.

21. The computer readable medium of claim 19, further comprising machine executable code that:

for each first entry, if there is a corresponding second entry in said second structure, updates said second entity associated with said second structure in accordance with said first entity.

22. The computer readable medium of claim 21, further comprising machine executable code that:

for each first entry, if there is no corresponding second entry in said second structure, creates a second entity and associating said second entity with said first entity.

23. The computer readable medium of claim 22, further comprising:

machine executable code that performs operations using corresponding first and second entities associated by an adapter structure using methods included in an adapter class of which said adapter structure is an instance.

24. The computer readable medium of claim 23, wherein said adapter structure includes a first reference to said first entity from said adapter structure, and a second reference to said second entity from said adapter structure.

25. The computer readable medium of claim 23, further comprising:

machine executable code that retrieves existing second entities in accordance with a top-level element of said first structure and associating a second entry with each of said second entities retrieved, said top-level element corresponding to a predetermined top level of a hierarchical relationship between said top-level element and other elements in said second representation of said data.

26. The computer readable medium of claim 25, wherein said second entities are stored in a data repository.

27. The computer readable medium of claim 26, wherein said second entities are stored in a persistent storage container as data objects, each of said second entities corresponding to an instance of a data object in said second representation.

28. The computer readable medium of claim 27, wherein said second entities represent elements of configuration data of a data storage system.

29. The computer readable medium of claim 25, further comprising:

machine executable code that traverses said first entries of said first structure and that determines if there is a corresponding entry in said second structure, updates said second entity associated with said second structure in accordance with said first entity and creates said second entity creating while traversing said first entries.

30. The computer readable medium of claim 29, comprising machine executable code that retrieves existing second entries in accordance with a top-level element prior to traversing said first entries.

31. The computer readable medium of claim 30, further comprising:

machine executable code that traverses said first entries of said first structure and creates an adapter structure for each of said first entries.

32. The computer readable medium of claim 31, wherein said machine executable code that traverses said first entries and said machine executable code that creates an adapter structure are executed prior to said machine executable code that retrieves existing second entries.

33. The computer readable medium of claim 19, wherein said first representation corresponds to a first graphical representation of elements having a first hierarchical relationship, said second representation corresponds to a second graphical representation of elements having a second hierarchical relationship different from said first hierarchical relationship.

34. The computer readable medium of claim 33, wherein said first graphical representation is a hierarchical relationship of data objects of a first model and said second graphical representation is a hierarchical relationship of data object of a second model different from said first model.

35. The computer readable medium of claim 34, wherein said first model includes first data objects that are different from second data objects included in said second model, and said first data objects are mapped to corresponding ones of said second data objects.

* * * * *